(12) United States Patent
Johnsen et al.

(10) Patent No.: US 7,398,394 B1
(45) Date of Patent: Jul. 8, 2008

(54) METHOD AND APPARATUS FOR AUTHENTICATING NODES IN A COMMUNICATIONS NETWORK

(76) Inventors: Bjorn Dag Johnsen, Vilberggrenda 9, N-0687, Oslo (NO); David Brean, 20 Winter St. #3, Boston, MA (US) 02122; Christopher Jackson, 2 Mamie La., Westford, MA (US) 01886

( * ) Notice: Subject to any disclaimer, the term of this patent is extended or adjusted under 35 U.S.C. 154(b) by 806 days.

(21) Appl. No.: 10/859,251

(22) Filed: Jun. 2, 2004

(51) Int. Cl.
*H04L 9/00* (2006.01)
(52) U.S. Cl. .................. 713/168; 713/150; 713/170
(58) Field of Classification Search .................. 713/168, 713/150, 151, 170
See application file for complete search history.

(56) References Cited

OTHER PUBLICATIONS http://www.infinibandta.org/about/, year 2007.*
A Comprehensive Framework for Enhancing Security in InfiniBand Architecture Lee, Manhee; Kim, Eun Jung; Parallel and Distributed Systems, IEEE Transactions on vol. 18, Issue 10, Oct. 2007 pp. 1393-1406.*
An Enhanced Congestion Control Mechanism in InfiniBand Networks for High Performance Computing Systems Shihang Yan; Geyong Min; Awan, I.; Advanced Information Networking and Applications, 2006. AINA 2006. 20th International Conference on vol. 1, Apr. 18-20, 2006 pp. 845-850.*
An interleaved hop-by-hop authentication scheme for filtering of injected false data in sensor networks Sencun Zhu; Setia, S.; Jajodia, S.; Peng Ning; Security and Privacy, 2004. Proceedings. 2004 IEEE Symposium on May 9-12, 2004 pp. 259-271.*
A Survey of Authentication Mechanisms: Authentication for Ad-Hoc Wireless Sensor Networks Boyle, P.; Newe, T.; Sensors Applications Symposium, 2007. SAS '07. IEEE Feb. 6-8, 2007 pp. 1-6.*
A secure mobile IP authentication based on identification protocol; Doo Ho Choi; Hyungon Kim; Kyoil Jung; Intelligent Signal Processing and Communication Systems, 2004. ISPACS 2004. Proceedings of 2004 International Symposium on; Nov. 18-19, 2004 pp. 709-712.*

\* cited by examiner

*Primary Examiner*—David Y Jung
(74) *Attorney, Agent, or Firm*—Park, Vaughan & Fleming LLP

(57) ABSTRACT

A system and a method for a first node in a communications network to authenticate a second node. The second node is connected by a communications link to a port of the first node. The method comprises setting a status that the second node is regarded as untrusted by the first node, so that the first node discards selected network management messages received over the communications link from the second node while it is regarded as untrusted. The method further comprises performing an authentication protocol with the second node by receiving at least one message from the second node over the communications link. Such message is discarded if it does not form part of the authentication protocol. The first node then treats the second node as trusted if the authentication protocol is successful, so that the selected network management messages received from the second node are no longer discarded.

17 Claims, 8 Drawing Sheets

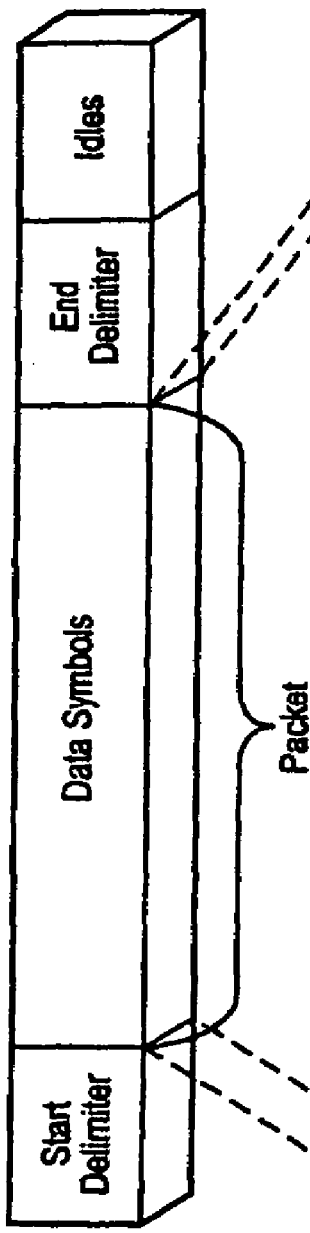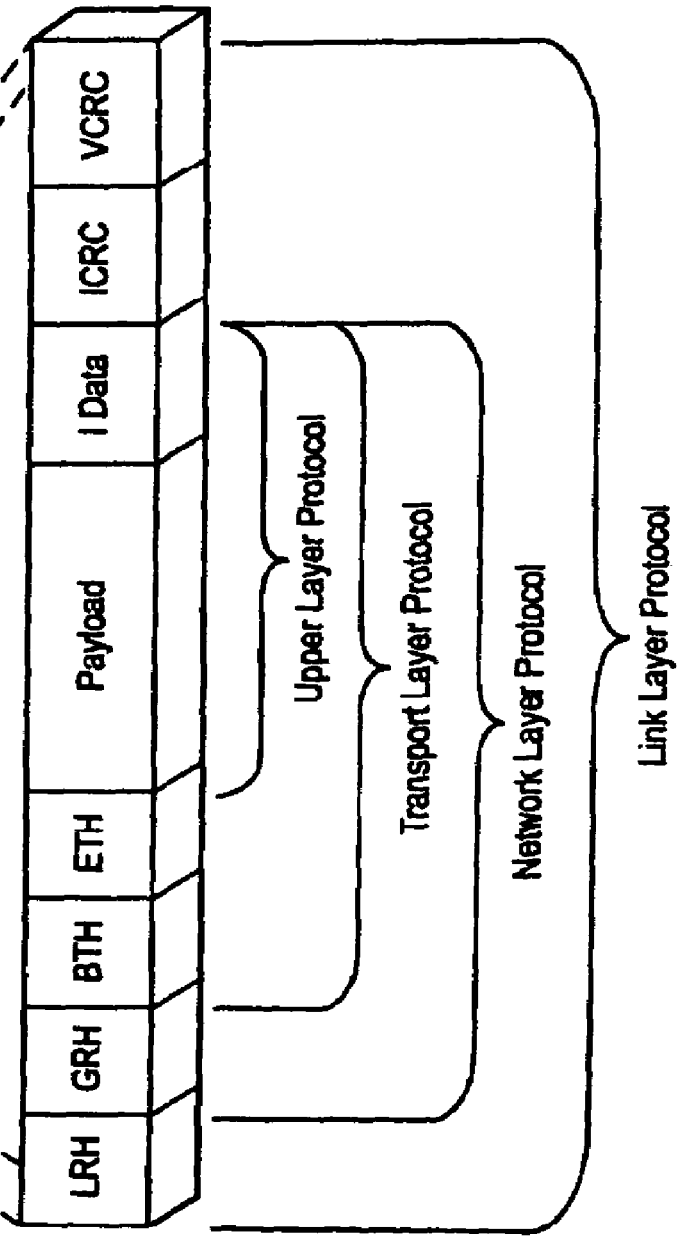

METHOD AND APPARATUS FOR AUTHENTICATING NODES IN A COMMUNICATIONS NETWORK

RELATED CASES

The present application is related to U.S. patent application Ser. No. 10/803,497, having a filing date of Mar. 18, 2004, which is assigned to the same assignee as the present application and is entitled "Secure Management of Operations in a Communication Fabric."

FIELD OF THE INVENTION

The present invention relates to communications networks, and in particular to the authentication of nodes within a communications network.

BACKGROUND OF THE INVENTION

The security of data communications networks is become increasingly important. As more and more sensitive data is transmitted over such networks, it is very important that data belonging to one user on the network does not somehow become exposed or visible to another user on the network. In addition, as organisations place ever greater reliance on the availability of networks for conducting their business and other operations, a network must be robust against hardware and software errors, component down-time, abnormal traffic conditions, and so on.

Some network problems may be innocent (i.e. non-malicious) in origin. For example, they may be caused by a hardware failure, a software bug, or some other weakness. In other cases, an adversary may try to cause network problems deliberately and with malicious intent, such as for motives of terrorism, commercial gain, political persuasion, etc. Depending upon the motives of the attack, the particular objective may be to obtain inappropriate access to data communications over the network, or to induce non-availability or some other non-functioning of the network. A malicious attack may exploit a known weakness in the network, and/or the attack may attempt to generate problems by the deliberate injection of errors, anomalous traffic, and so on.

It is therefore important for a network to be reliable and secure, and to be as resistant as possible against problems, whether deliberate or otherwise. In addition, it is also important for a network to be able to operate quickly and without delays.

SUMMARY OF THE INVENTION

Accordingly, one embodiment of the invention provides a method for a first node in a communications network to authenticate a second node in the network. The second node is connected by a communications link to a port of the first node. The method comprises setting a status of the second node as untrusted at the first node. The first node discards at least selected network management messages received over the communications link from the second node while the first node regards the second node as untrusted. This discarding of messages helps to protect the network against a malfunctioning or malicious node that might otherwise improperly alter or control the configuration of the network.

The method further comprises performing an authentication protocol with the second node. The authentication protocol includes receiving at least one message from the second node over the communications link. This message is discarded if it does not form part of the authentication protocol. The status of the second node is set to trusted if the authentication protocol is successful, so that network management messages received from the second node over the communications link are now no longer discarded.

In one embodiment, the authentication protocol includes sending a challenge from the first node to the second node, and the message from the second node to the first node comprises a response to the challenge. In one embodiment, the authentication protocol is performed by exchanging one or more network management messages between the first node and the second node.

In one embodiment, the authentication protocol is based on key data available to the first node and the second node. The key data may comprise a key pair for a public key cryptographic algorithm, with the second node maintaining a private key of the key pair, and the first node maintaining a public key corresponding to the private key. The key data available to the first node may be stored in the first node itself, or is otherwise available to the first node, such as by being accessible from a third node having a trusted status.

Another embodiment of the invention provides a node for use in a communications network. The node (referred to as the first node) includes a port for connecting to a communications link to a second node, and a trust indicator for indicating a status of the second node according to whether the first node regards the second node as trusted or untrusted. The first node discards at least selected network management messages received over the communications link from the second node while the first node regards the second node as untrusted. The first node further comprises an authentication mechanism operable to perform an authentication protocol with the second node. The authentication protocol includes receiving at least one message from the second node over the communications link, where the message is discarded if it does not form part of the authentication protocol. The status of the second node is set to trusted if the authentication protocol is successful, whereby network management messages received from the second node over the communications link are no longer discarded.

It will be appreciated that the communications node embodiment of the invention will generally benefit from the same particular features as the method embodiment of the invention described above.

BRIEF DESCRIPTION OF THE DRAWINGS

Specific embodiments of the present invention will now be described by way of example only with reference to the accompanying figures in which:

FIG. 6 shows schematically the structure of a message to be transmitted via an InfiniBand Architecture system.

FIG. 7 shows schematically the format of a packet of the message of FIG. 6.

DETAILED DESCRIPTION

1) The InfiniBand Architecture

The InfiniBand architecture provides a standard computer networking environment defined and administered by the InfiniBand Trade Association, which was founded by Compaq, Dell, Hewlett-Packard, IBM, Intel, Microsoft and Sun Microsystems (InfiniBand is a trademark of the InfiniBand Trade Association; other names are trademarks of their respective companies). The InfiniBand Architecture defines a System Area Network (SAN) for connecting multiple independent processor platforms (i.e. host processor nodes), I/O platforms and I/O devices. A full definition of the InfiniBand Architecture may be found in the InfiniBand Architecture Specification Volumes 1 and 2, available from the InfiniBandTrade Association (www.InfiniBandta.org), and which is hereby incorporated hereinto by reference.

An InfiniBand Architecture system area network (SAN) provides a communications and management infrastructure supporting both I/O and interprocessor communications for one or more computer systems. An InfiniBand Architecture system can range from a small server with one processor and a few I/O devices to a massively parallel supercomputer installation with hundreds of processors and thousands of I/O devices.

The InfiniBand Architecture defines a switched communications fabric allowing many devices to communicate concurrently with high bandwidth and low latency in a protected, remotely managed environment. An end node can communicate over multiple InfiniBand Architecture ports and can utilise multiple paths through the InfiniBand Architecture fabric. A multiplicity of InfiniBand Architecture ports and paths through the network are provided both for fault tolerance and for increased data transfer bandwidth.

Figure 1:
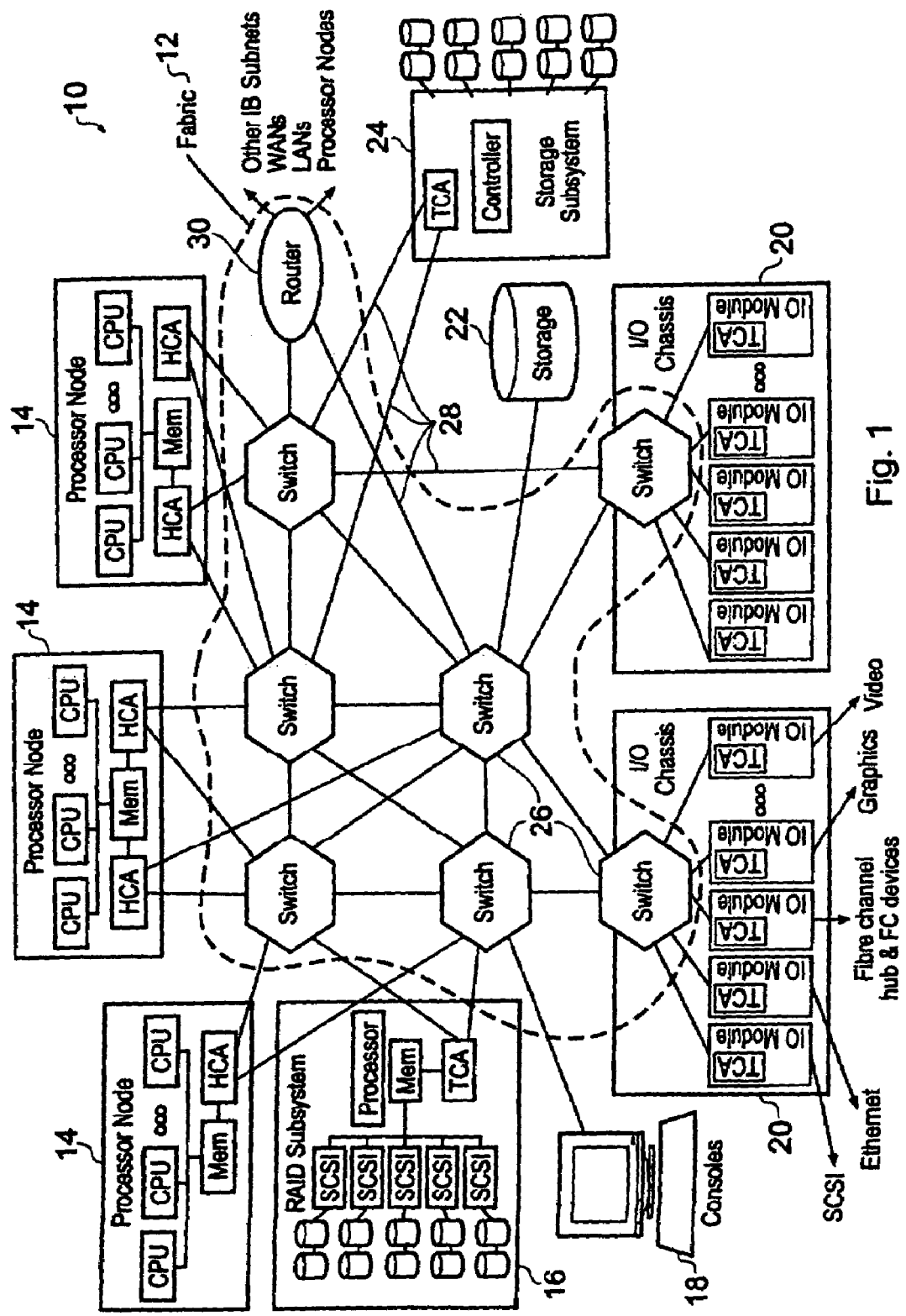
FIG. 1 is a schematic block diagram showing an example of interconnection of computing system elements via the InfiniBand networking architecture.

An example of an InfiniBand Architecture system area network is shown in FIG. 1. As can be seen from FIG. 1, the system area network 10 comprises an InfiniBand Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with InfiniBand links 28 providing data connections between the switches 26 and between the nodes attached to the fabric 12. Also included in the fabric 12 is a router 30 for providing connections to and from other networks, which may be other InfiniBand Architecture subnets, non-InfiniBandArchitecture LANs and WANs, and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each endnode 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32. For example, a processor node 16 may comprise a plurality of processors and each processor may have one or more individual Queue Pairs assigned to handle requests and responses flowing to and from that particular processor of the processor node via fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
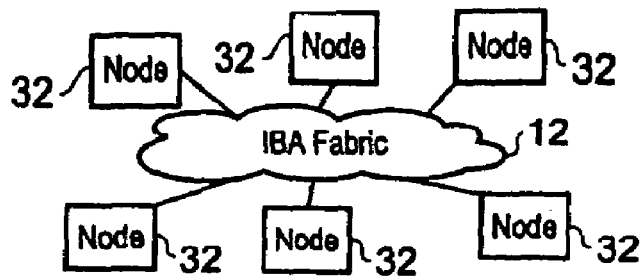
FIG. 2 is a schematic block diagram of a simplified arrangement of an InfiniBand Architecture system.
Figure 3:
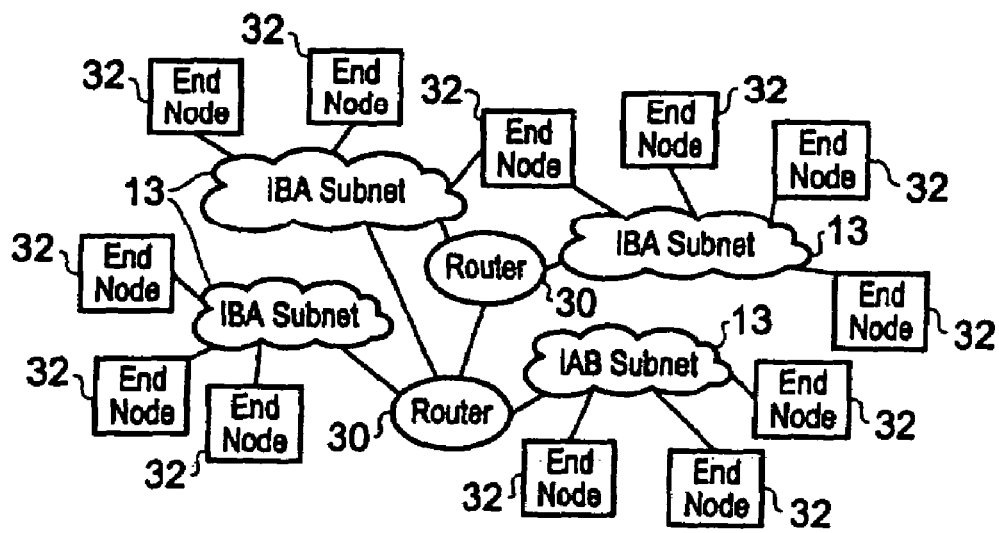
FIG. 3 is a schematic block diagram of another simplified arrangement of an InfiniBand Architecture system.
Figure 4:
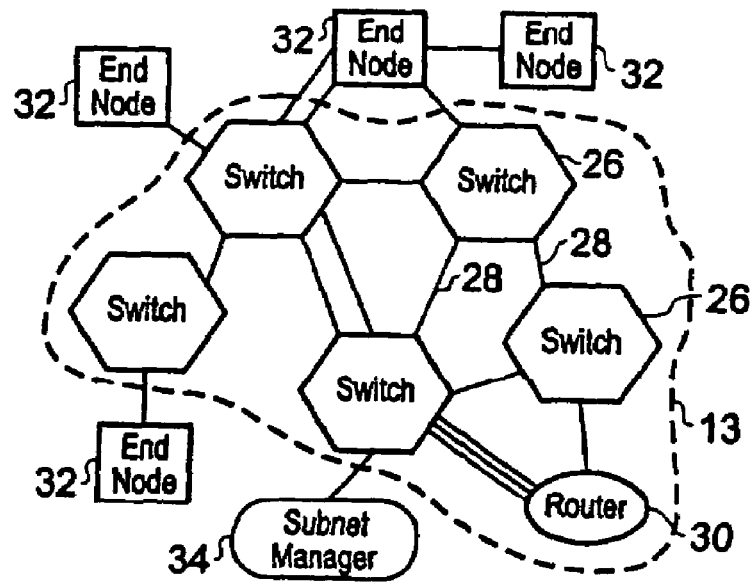
FIG. 4 is a schematic block diagram of a further simplified arrangement of an InfiniBand Architecture system.

Examples of possible InfiniBand Architecture topologies are shown in FIGS. 2, 3 and 4. FIG. 2 shows a high level simplified topology example where a number of end nodes 32 are interconnected by the fabric 12. An InfiniBand Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
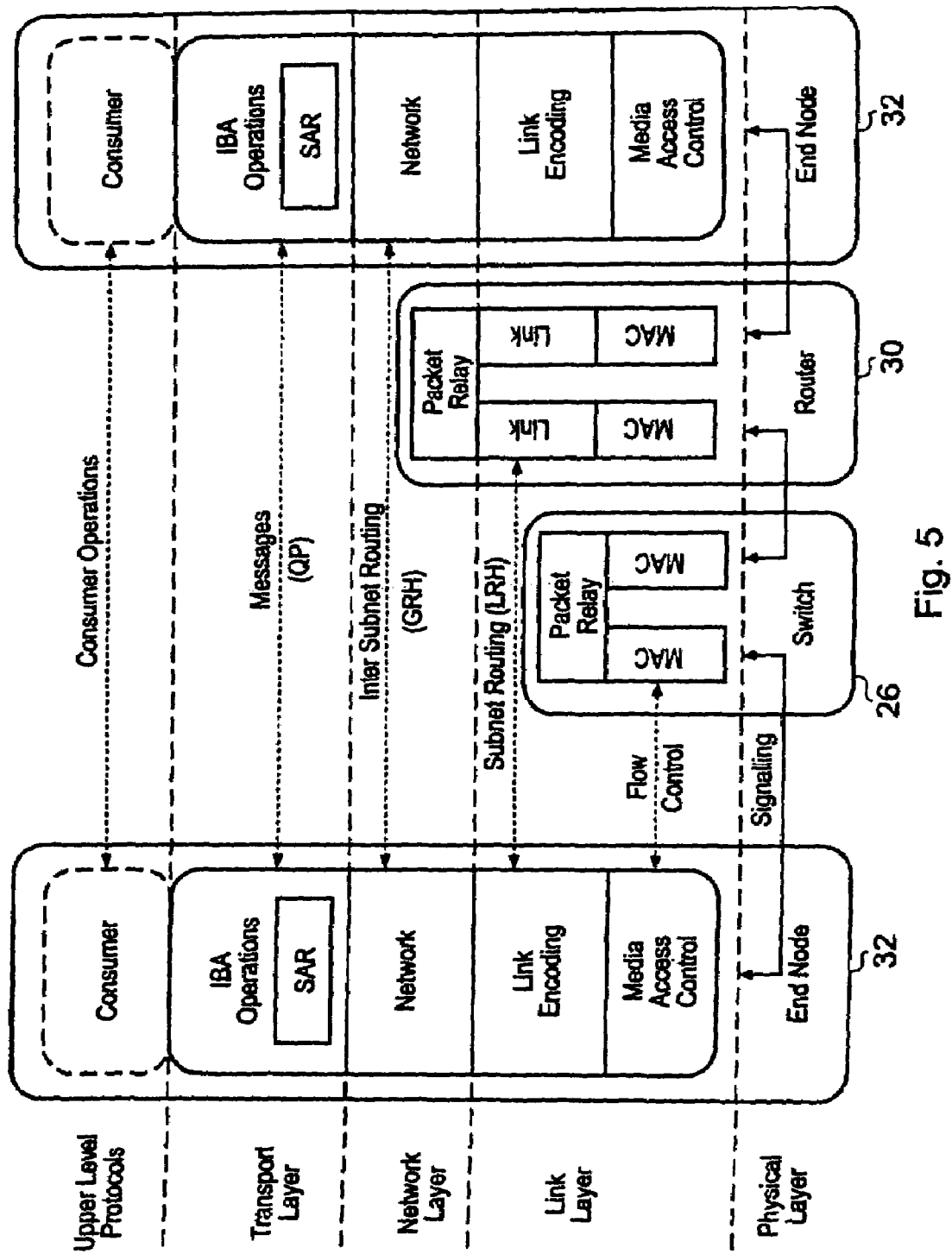
FIG. 5 is a schematic illustration of the layers of an InfiniBand Architecture system.

Referring now to FIG. 5, there is shown an illustration of the architecture layers of an InfiniBand Architecture system. Starting with the physical layer, this specifies how bits are placed onto the interconnections 28 and defines the symbols used for framing (i.e. start of packet and end of packet), data, and fill between packets (idles). It also specifies the signalling protocol as to what constitutes a validly formed packet (i.e. symbol encoding, proper alignment of framing symbols, no invalid or non-data symbols between start and end delimiters, no disparity errors, synchronisation method, etc.). The signalling protocol used by the InfiniBand Architecture utilises a differential signal. The interconnects 28 between nodes of an InfiniBand Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

The data packet format is illustrated in FIG. 7. Packets may be one of two types, IBA (InfiniBand Architecture) Packets or RAW (non InfiniBand Architecture) Packets. IBA Packets have IBA defined transport headers, are routed on InfiniBand Architecture fabrics 12, and use native InfiniBand Architecture transport facilities. Raw Packets may be routed on IBA fabrics but do not contain InfiniBand Architecture transport headers. From an InfiniBand point of view, these packets contain only InfiniBand routing headers, payload and CRC. The InfiniBand Architecture does not define the processing of these packets above the link and network layers. These packets can be used to support non-InfiniBand Architecture transports (e.g. TCP/IP, IPX/SPX, NetBUI etc) over an InfiniBand fabric.

The link layer describes the packet format and protocols for packet operation, e.g. flow control and how packets are routed within a subnet between the source and the destination. Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets. Each end of the link has a transmitter and a receiver. The InfiniBand Architecture utilises an "absolute" credit based flow control scheme, in which InfiniBand Architecture receivers provide a "credit limit". A credit limit is an indication of the total amount of data that a transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The InfiniBand Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement back to the originator end node to indicate whether all packets have been received successfully.

The upper level protocols are completely software based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
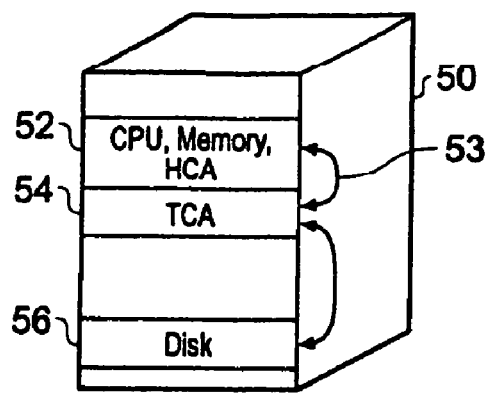
FIG. 8 is a schematic block diagram showing an arrangement where the InfiniBand Architecture is used to interconnect components within a computer system.
Figure 9:
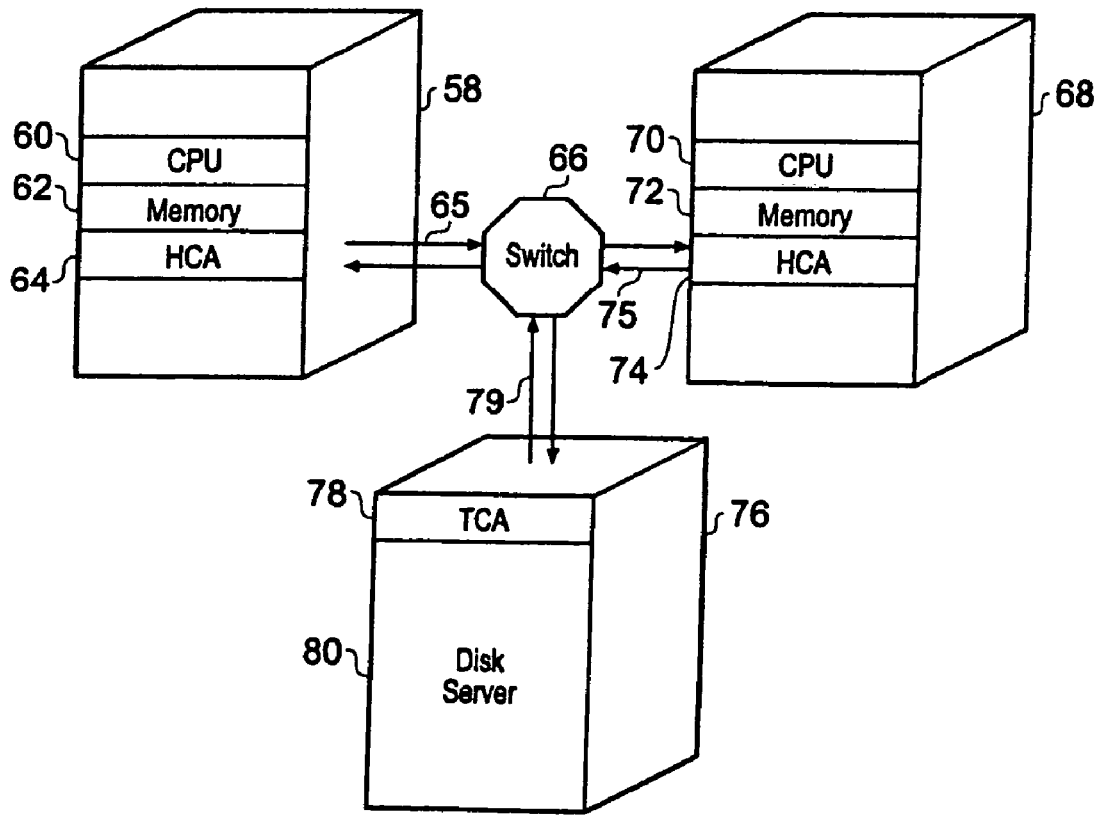
FIG. 9 is a schematic block diagram showing an arrangement where the InfiniBand Architecture is used as an interconnect between computer systems.

Examples of simple InfiniBand Architecture systems are shown in FIGS. 8 and 9. FIG. 8 shows an arrangement where the InfiniBand Architecture is used to interconnect components within a standard computer system rack 50. In this example, the CPU, memory and a Host Channel Adapter 52 are interconnected using conventional non-InfiniBand Architecture techniques. The Host Channel Adapter 52 of the CPU and memory communicate via an InfiniBand Architecture interconnect 53 with a Target Channel Adapter 54. The Target Channel Adapter 54 communicates with a disk drive unit 56 via a SCSI (Small Computer System Interface) connection. Thus the InfiniBand Architecture is configured in this example to facilitate communications between elements of the same computer system.

FIG. 9 shows an arrangement where the InfiniBand Architecture is used only as an interconnect between computers. In this example a first computer system is mounted in a rack 58 and comprises a CPU 60, memory 62 and a Host Channel Adapter 64 interconnected via non-InfiniBand Architecture techniques. Via the Host Channel adapter 64, the first computer system communicates to and from a switch 66 across interconnects 65. Also connected to the switch 66 is a second computer system mounted in a rack 68 and comprising a CPU 70, memory 72 and a Host Channel Adapter 74, which connects to the switch 66 via interconnects 75. Data storage for the first and second computer systems is provided by a disk server 80 mounted in a rack 76. The disk server 80 connects with a Target Channel Adapter 78 also mounted within the rack 76 by non-InfiniBand Architecture techniques. The Target Channel Adapter 78 connects to the switch 66 via interconnects 79. Thus the InfiniBand Architecture is configured in this example to facilitate communication between more than one distinct computer system. The techniques shown in FIGS. 8 and 9 may be employed in combination with one another, for example a computer system using the InfiniBand Architecture for internal communications may also be connected to other computer systems via a network based on the InfiniBand Architecture.

Figure 10:
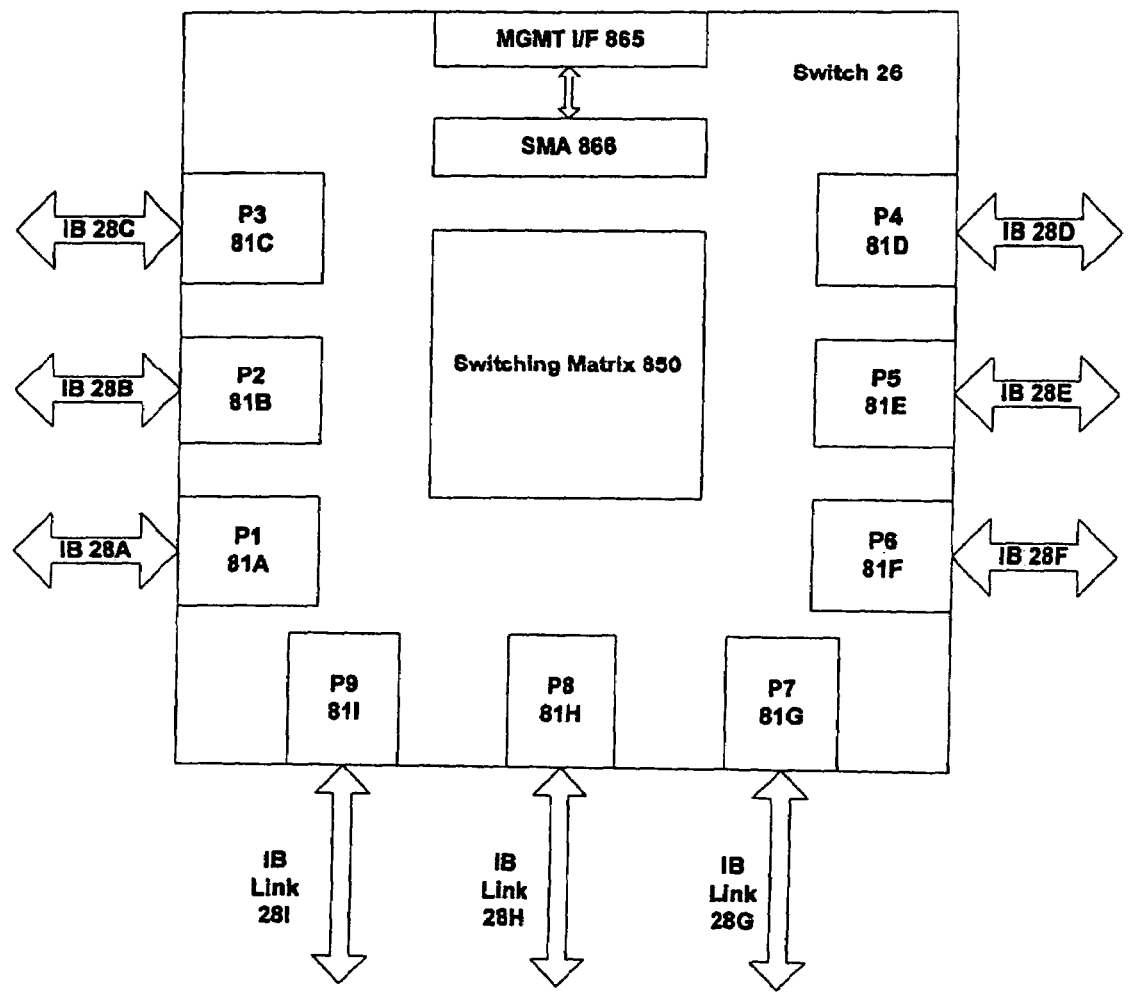
FIG. 10 is a schematic block diagram showing a switch for use in an InfiniBand network in accordance with one embodiment of the invention.

FIG. 10 illustrates a switch 26 for use in fabric 12 in accordance with one embodiment of the invention. Switch 26 is implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the embodiment illustrated in FIG. 10, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding InfiniBand duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the InfiniBand Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An InfiniBand switch must support at least two virtual lanes on each link (i.e. data lane VL0 and management lane VL15). In one particular embodiment, switch 26 supports four virtual lanes for general data communication plus one virtual lane for management purposes (VL15).

In accordance with the InfiniBand Architecture, a packet can be specified as having one of sixteen different service levels (SLs). The service level for a particular packet is specified in the local route header (LRH), and remains constant as the packet transits an InfiniBand subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an InfiniBand network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The InfiniBand Architecture supports the concept of partitioning in order to provide logical isolation of components sharing the same subnet. All nodes included in a route from a source to a destination must share the same 16-bit partition key (P_Key), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the P_Key value within the incoming packet matches the indexed P_Key value in the P_Key table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the embodiment mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the InfiniBand standard (in order to ensure network connectivity), to some extent switching matrix 850 can be regarded as a more generic switching device, since it is internal to switch 26 and therefore shielded (at least in part) from other network devices.

The InfiniBand architecture supports two general modes of communication. The first of these is unicast or point-to-point, in which each data packet goes from a single source to a single destination. This translates into switching matrix 850 transferring a packet from one incoming port to one outgoing port. The other mode of communication in InfiniBand is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an InfiniBand network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the InfiniBand network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

2) Subnet Management Packets

As previously mentioned, partitions provide a mechanism to separate out different users of a network. However, according to the InfiniBand specification, the partition keys of subnet management packets (SMPs), which travel on VL15, are ignored. Thus, SMPs may be sent or received by any end-node. This creates a security problem. In particular, end-nodes in different partitions are normally prevented from communicating with each other, but misbehaving end-nodes may be able to circumvent this prohibition by enclosing their communications within SMPs.

A further potential problem is that an end-node may impersonate a subnet manager 34. For example, when an end-node boots in a partition, an impersonator may portray itself as the subnet manager for that partition before the end-node establishes communication with the true subnet manager. Amongst other things, this allows the impersonator to use the resources of the end-node, and to make the end-node act as a proxy for the impersonator, and so on.

According to the InfiniBand specification, M_Keys are included in SMPs as a way to provide authentication to the various target ports that the SMP is sent by a legitimate instance. However, this requires the various ports/nodes to be configured with an M_Key value prior to receiving SMPs via the InfiniBand fabric in order for authentication to take place. This imposes significant requirements on the various node implementations, as well as the subnet (and fabric) managers.

An additional issue with M_Keys is that the actual 64-bit value must be selected in a way that does not allow it to be (easily) guessed by nodes that are not supposed to know or use it. Furthermore, all switches must be trusted not to observe and make inappropriate use of M_Keys being passed to other nodes.

Some of the above problems are addressed by the SMP filtering scheme described in the above-referenced patent application Ser. No. 10/803,497, entitled "Securing Management Operations in a Communication Fabric". In the approach described therein, each port of a switching element in a communication fabric is assigned an indicator reflecting a level of trust given to the node of the communication link connected to that port (referred to herein as the link partner node). The level of trust determines whether a particular type of SMP may or may not be sent or received through the port. A trusted node is permitted to send or receive any type of SMP. An untrusted node is only able to receive SMPs sent from a subnet manager and is only able to send SMPs to a subnet manager. In one implementation, only a trusted node can be a subnet manager, and switches and other switching devices are configured to trust each other. Other policies may be applied in other implementations. For example, only switches that are upstream of a given switch may be trusted by that switch—i.e., switches that are closer (or on a path) to a subnet manager.

In one embodiment therefore, a separate trust indicator is associated with each port of a switch, and each port which is coupled to a switch is marked as trusted, while the setting of each port coupled to an end-node depends upon a level of trust in the end-node. For example, with an end-node that is regarded as not physically secure (e.g., available for uncontrolled access), a switch port to which the end-node is coupled may be marked as untrusted. The trust indicator may comprise a register or other portion of memory (e.g., a single bit), or may comprise hardware such as a DIP (Dual Inline Package) switch.

In one embodiment, a switch port coupled to a host is only set to trusted if the host is trusted enough to act as a subnet manager or backup subnet manager. For example, only end-nodes that are under the control of a fabric administrator or subnet administrator may be trusted. In this embodiment, switch ports coupled to other hosts and other end-nodes (e.g., I/O subsystems) would be marked untrusted.

In one embodiment for an InfiniBand environment, all packets travelling on VL15 are separated into four categories or types:

Category 1: A subnet management request from the subnet manager to an end-node;

Category 2: A reply from an end-node to a subnet management request from the subnet manager;

Category 3: A subnet management request from an end-node to the subnet manager; and Category 4: A subnet management reply from the subnet manager to a request from an end-node.

Categorization of a particular SMP is based on the management class or method in which the SMP was generated.

Untrusted end-nodes (i.e. end-nodes coupled to switching ports that have indicators set to something other than "trusted") are only permitted to send VL15 packets in categories 2 and 3, and are only permitted to receive VL15 packets in categories 1 and 4. Trusted end-nodes (i.e., end-nodes coupled to switching ports that have indicators set to "trusted"), and switches, can send and receive all four categories of VL15 packets.

Each VL15 packet is examined at the switch that would normally forward the packet to an end-node or receive it from the end-node, based on the port switch through which the packet is received or is to be sent. The switch discards VL15 packets received from or directed to an end-node (and may report them to the subnet manager) if they are not of a permitted type. As a result, no VL15 packet can traverse the communication fabric if it is not initiated by or directed to a trusted node. This approach therefore prevents an untrusted end-node from using VL15 of an InfiniBand fabric to evade partitioning restrictions, because all packets that such an untrusted end-node would send on VL15 are only forwarded if they are classified as category 2 or category 3 packets, and these types of packets will not be delivered to any untrusted end-node. In addition, because only trusted nodes can send category 1 and category 4 VL15 packets, only trusted end-nodes can operate as subnet managers, whereas an untrusted node cannot operate as (i.e. impersonate) a subnet manager.

In one implementation of the above SMP filtering approach, information about which local switch ports are connected to trusted neighbours is supplied out-of-band (i.e. not over the InfiniBand network itself), prior to any SMP activity in relation to the relevant ports. If the connectivity of the switch is changed, this information needs to be updated. In the general case, the policy information about trusted ports is based on operator input about how the fabric is wired. If the operator provides incorrect information or sets up a physical wiring that does not correspond to the policy information provided, the security of the system may be compromised.

One possible resolution is to associate policy information with fixed, globally unique IDs that are matched to the actual port or hardware implementation. Such IDs may be defined in the factory. With this approach, the configuration (and any updates thereto) can be detected automatically, thereby reducing the impact of operator errors. However, this approach does not have good security, since the ID reported by a node may be a false value provided by a malicious or malfunctioning node or by an intruder on the network.

3) Authentication Protocol

Figure 11:
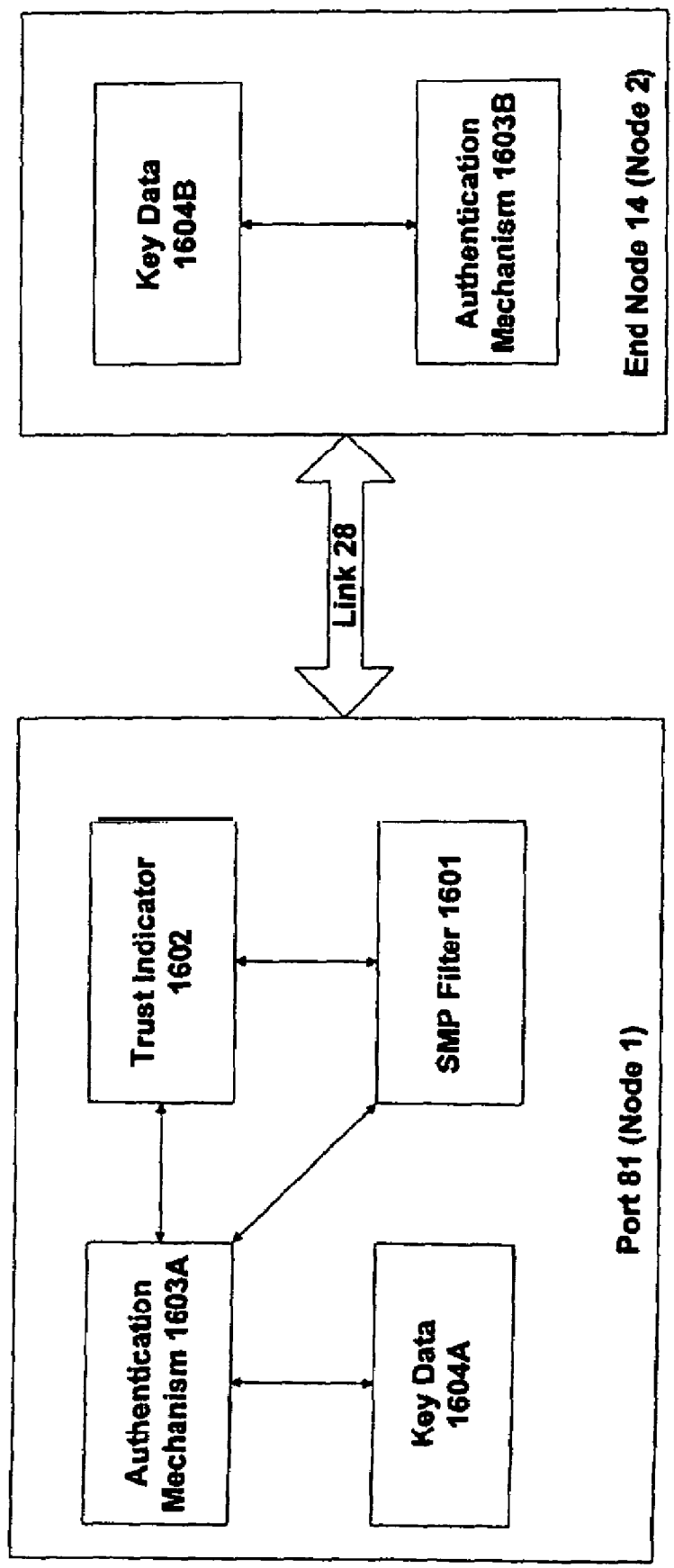
FIG. 11 is a schematic block diagram illustrating an authentication procedure for use in an InfiniBand network in accordance with one embodiment of the invention.

FIG. 11 illustrates an approach to establish the trust indicator in accordance with one embodiment of the invention. In particular, FIG. 11 depicts a portion of an InfiniBand network comprising link 28 which joins port 81 (part of a switch) to an end-node 14. Port 81 will be referred to as node 1, while end-node 14 will be referred to as node 2.

Port 81 implements an SMP filter 1601 as previously described, whereby SMP messages to and from a node that is not trusted are filtered, and only selected such messages are allowed to pass through port 81. The SMP filter 1601 relies upon trust indicator 1602 to determine whether or not the partner node for link 28 (i.e. node 2) is to be regarded as trusted (and so whether or not SMP filtering should be applied).

As a conservative measure, trust indicator is initially set to an untrusted state (e.g. indicated by a binary 0). For example, this might be the default setting at boot time for node 1. Node 1 then uses authentication mechanism 1603A, which uses in-band communications with node 2 (i.e. over link 28), to establish the authenticity of node 2. Node 2 includes its own authentication mechanism 1603B, which interacts with the authentication mechanism 1603A of node 1 to complete an authentication protocol. Assuming satisfactory completion of the protocol, authentication mechanism 1603A can now set the status of trust indicator 1602 to trusted (e.g. as indicated by a binary 1), and the behaviour of SMP filter 1601 is then updated accordingly. For example, it may now be prepared to pass on all SMP messages between node 2 and the rest of the InfiniBand network (not shown in FIG. 11).

The authentication protocol is performed in-band, in other words over InfiniBand link 28 itself. In one particular embodiment, the authentication protocol is implemented using subnet management packets over link 28. This then avoids the need for any out-of-band communications between node 1 and node 2 for authentication purposes.

In one embodiment, the authentication protocol is based on shared key data 1604A and 1604B, held by node 1 and node 2 respectively. In one particular embodiment, the shared key data represents the public and private keys of an asymmetric (public key) cryptography system, where key data 1604B represents the private key for node 2, and key data 1604A represents the corresponding public key. The authentication protocol allows node 1 to confirm that node 2 has the private key corresponding to public key held as the key data 1604A, and is therefore to be regarded as trusted.

Figure 12:
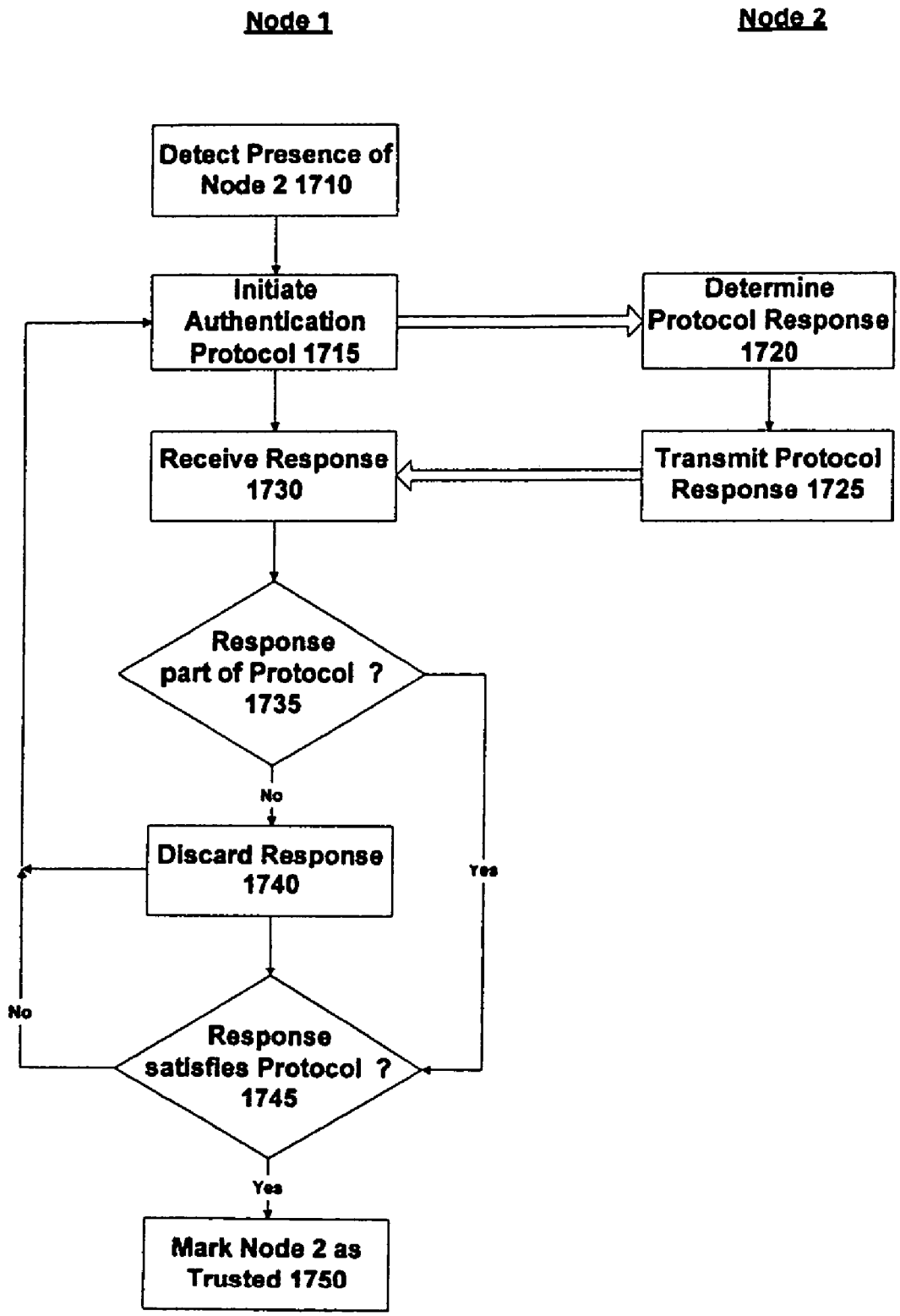
FIG. 12 is a flowchart illustrating an authentication procedure for use in an InfiniBand network in accordance with one embodiment of the invention.

FIG. 12 is a flowchart illustrating a series of operations whereby node 1 and node 2 can perform such authentication. The flowchart commences with node 1 detecting the presence of node 2 (1710), for example at boot time. This may involve an initial exchange of messages, as is known in the art. Node 1 now commences an authentication protocol with node 2 (1715), which may involve the sending of a challenge to node 2 (as described in more detail below). Node 2 determines an appropriate authentication response to transmit to node 1 (1720), based for example on key data 1604B, and this response is duly transmitted to node 1 (1725).

When node 1 receives the response from node 2 (1730), it determines whether the response is part of the authentication protocol (1735). If not the response may be discarded (1740), depending perhaps on the type of message (any messages which require a trusted status to proceed are discarded). Assuming however that the response is part of the authentication protocol, a test is made to determine whether or not the response satisfies the protocol (1745). In general, this test is based on determining whether or not the response conforms to stored key data 1604A. If this is indeed the case, node 2 can now be regarded as trusted and the trust indicator 1602 held in node 1 in respect of node 2 is updated accordingly (1750). In future therefore, SMP filter 1601 will treat packets to and from node 2 in accordance with the new status of node 2 as a trusted node. On the other hand, if the authentication protocol fails, the trust indicator 1602 stays in its untrusted status. In this case, node 1 may attempt to restart the authentication process with node 2 (although the number of such retries will normally be limited).

It will be appreciated that there are several possible variations on the processing shown in FIG. 12. For example node 1 may initiate the authentication protocol at operation 1715 without formally having first detected the presence of node 2. In other words, the authentication protocol itself may be used to determine whether any partner node is present on link 28 (if not, then no response will be received, and so the authentication will fail). Another possibility is that both operations 1710 and 1715 are omitted. In this situation, node 2 may launch the authentication protocol on its own initiative (such as in response to detecting a new connection to node 1, or detecting the presence of node 1 at the end of link 28, or simply in response to node 2 being booted up).

In one embodiment, the authentication protocol includes a message accompanied by a digital signature. The digital signature is obtained by first determining a hash of the message, and then encrypting the hash using the private key 1604B of node 2. When node 1 receives this message, it calculates itself the hash of the received message, and also decrypts the received digital signature using its version 1604A of the public key of node 2. If the decrypted version of the received hash matches the newly calculated version then the authentication is successful, since it confirms that node 2 has the private key 1604B corresponding to public key 1604A. Note that this digital signature authentication may be started by node 2 on its own initiative—i.e. it does not require any initial information from node 1.

One weakness with the above approach is that node 2 may simply use a copy of a legitimate message that it has intercepted from another (authentic) node. This possibility can be avoided by the use of a challenge-response protocol. In one implementation of such a challenge-response arrangement, node 1 generates a random number which is transmitted to node 2 (at operation 1715 in the flowchart of FIG. 12). Node 2 then encrypts this challenge with its private key 1604B, and sends the encrypted challenge as a response back to node 1 (corresponding to operation 1725). Node 1 decrypts the received response with its version of the public key 1604A for node 2, and verifies that this matches the original challenge sent out. If so, this confirms that node 2 is in possession of the private key 1604B corresponding to public key 1604A, and so the authentication is successful. Moreover, assuming that node 1 generates a different challenge for each authentication, it is known that node 2 must have access to private key 1604B to generate the response (it cannot simply copy a response from a previous authentication exchange, since this will relate to a different challenge).

In one embodiment, the challenge-response procedure may be combined with the digital signature approach, in that the challenge represents the message that is to be returned with a digital signature by node 2. The skilled person will be aware of may other possible authentication protocols that could be used instead, some providing greater sophistication and security, including mutual (two-way) authentication protocols. Note that different authentication protocols might be supported by different nodes, and part of the authentication process would be to establish which protocol to use between any given pair of nodes. In addition, although the authentication has been described primarily in conjunction with an InfiniBand communications network, it will be appreciated that an analogous approach could be used with communications networks that adopt other protocols.

The use of an in-band authentication protocol replaces the need for pre-configuration of per-port policy information with an SMP based authentication protocol that automatically and dynamically establishes trust status for the various partner ports. Thus the initial phase of the SMP filtering may now only allow a partner port to send (and receive) SMP packets that are part of the authentication protocol itself (handshakes, etc).

The facility to participate in the in-band authentication protocol may be an in-built function of a switch node. Such functionality may also be subject to configuration (of the switch node itself). Nodes that do not support the authentication process would generally be regarded as untrusted, but could potentially gain trusted status on some other basis (e.g. through an out-of-band mechanism).

In the exchange of messages between node 1 and node 2, node 2 may supply node 1 with some identifier for node 2. Node 1 may use this identifier to access appropriate key data 1604A, for example if node 1 holds key data for multiple different nodes. Note that this approach is robust against node 2 trying to impersonate another node by deliberately supplying an incorrect identifier, since the authentication protocol using the public key corresponding to the node that node 2 is trying to impersonate will fail (assuming that node 2 does not also know the private key for the node being impersonated). On the other hand, if the authentication protocol is successful, then this in effect confirms the identity of node 2 (as the holder of key data 1604B).

The authentication protocols described above rely upon the integrity of key data 1604A. This data may be retained within some secure storage device within node 1. Alternatively node 1 may access key data (on-the-fly) from some other location, such as another (trusted) location in the network. Another possibility is that node 1 acquires key data 1604A using some out-of-band link to a trusted source (e.g. using Ethernet rather than InfiniBand). If key data 1604A corresponds to a public key algorithm, then key data 1604A does not have to be maintained confidential itself. However, it should be kept secure against corruption or manipulation by a potential adversary.

Although the above embodiments have used public key encryption, symmetric encryption could also be used. In this case, key data 1604B is the same as key data 1604A (rather than corresponding public and private keys). In general, the same authentication protocols as described above can be used with symmetric encryption (e.g. challenge-response). However, since key data 1604 is now no longer public, greater care must be taken with its supply to and maintenance in node 1, in order to preserve the security of the authentication procedure.

Another possibility is that the authentication protocol is based on some shared (secret) functionality, rather than key data 1604. For example, node 1 may send a challenge to node 2, and node 2 may perform some secret function on the challenge to generate the response, which is then returned to node 1 for authentication (node 1 is also aware of the secret function). In general it is easier and more reliable for the security of the function to depend upon key data 1604 (as shown in FIG. 11), rather than secret logical or mathematical operations, which are more easily duplicated.

One embodiment of the invention described herein is provided as a computer program product, which may comprise program instructions stored on a removable storage medium, for example an optical (CD ROM, DVD, etc), semiconductor (e.g. flash memory) or magnetic (floppy disk, tape, etc) device. Such a medium can then be introduced into a computer system, such as a server, a client, a smart card, a network device (e.g. a switch) etc., in order to transfer the program instructions to the system. Alternatively, the program instructions may be transferred to the computer system by download via a transmission signal medium over a network, for example, a local area network (LAN), the Internet, and so on. The transferred program instructions are often stored on a hard disk or other non-volatile storage of a computer system, and loaded for use into random access memory (RAM) for execution by a system processor.

In conclusion, a variety of particular embodiments have been described in detail herein, but it will be appreciated that this is by way of exemplification only. The skilled person will be aware of many further potential modifications and adaptations that fall within the scope of the claims and their equivalents.

The invention claimed is:

1. A method for a first node in a communications network to protect the communications network against malicious nodes, wherein the second node is connected by a communications link to a port of the first node, the method comprising:
    setting a status of the second node as untrusted at the first node;
    receiving a first network management message at the first node from the second node;
    in response to determining that the second node's status is set to untrusted, discarding the first network management message thereby protecting the communications network against malicious nodes;
    performing an authentication protocol with the second node, said authentication protocol including receiving at least one message from the second node over said communications link, wherein said at least one message is discarded if it does not form part of the authentication protocol;
    in response to determining that the authentication protocol was successful, setting the status of the second node as trusted;
    receiving a second network management message at the first node from the second node;
    in response to determining that the second node's status is set to trusted not discarding the second network management message.

2. The method of claim 1, wherein said authentication protocol includes sending a challenge from the first node to the second node, and wherein said at least one message comprises a response to said challenge.

3. The method of claim 1, wherein said authentication protocol is based on key data available to the first node and the second node.

4. The method of claim 3, wherein said key data comprises a key pair for a public key cryptographic algorithm, and the second node maintains a private key of the key pair, and the first node maintains a public key corresponding to said private key.

5. The method of claim 3, wherein the key data available to the first node is stored in the first node.

6. The method of claim 3, wherein the key data available to the first node is accessed from a third node, wherein said third node has a trusted status.

7. The method of claim 1, wherein said authentication protocol is performed by exchanging one or more network management messages between the first node and the second node.

8. The method of claim 1, wherein said communications network comprises an InfiniBand network.

9. A node for use in a communications network representing a first node in the network, said first node comprising:
    a port for connecting to a communications link to a second node, wherein the first node receives a first network management message and a second network management message from the second node via the port;
    a trust indicator for indicating a status of the second node according to whether the first node regards the second node as trusted or untrusted, wherein the first node discards at least selected network management messages received over said communications link from the second node while the first node regards the second node as untrusted;
    an authentication mechanism operable to perform an authentication protocol with the second node, said authentication protocol including receiving at least one message from the second node over said communications link, wherein said at least one message is discarded if it does not form part of the authentication protocol, and wherein the status of the second node is set to trusted if the authentication protocol is successful, such that network management messages received from the second node over said communications link are no longer discarded; and
    a discarding mechanism operable to discard the first network management message in response to determining that the second node is untrusted, and to not discard the second network management message in response to determining that the second node is trusted, thereby protecting the communications network against malicious nodes.

10. The node of claim 9, wherein said authentication protocol includes sending a challenge from the first node to the second node, and wherein said at least one message comprises a response to said challenge.

11. The node of claim 9, wherein said authentication protocol is based on key data available to the first node and the second node.

12. The node of claim 11, wherein said key data comprises a key pair for a public key cryptographic algorithm, and the second node maintains a private key of the key pair, and the first node maintains a public key corresponding to said private key.

13. The node of claim 11, wherein the key data available to the first node is stored in the first node.

14. The node of claim 11, wherein the key data available to the first node is accessed from a third node, wherein said third node has a trusted status.

15. The node of claim 9, wherein said authentication protocol is performed by exchanging one or more network management messages between the first node and the second node.

16. The node of claim 9, wherein said communications network comprises an InfiniBand network.

17. A computer program product comprising program instructions that when loaded into a first node in a communications network cause the first node to protect the communications network against malicious nodes, wherein the second node is connected by a communications link to a port of the first node, said protecting being performed by the method of:
    setting a status of the second node as untrusted at the first node;
    receiving a first network management message at the first node from the second node;

in response to determining that the second node's status is set to untrusted, discarding the first network management message, thereby protecting the communications network against malicious nodes;

performing an authentication protocol with the second node, said authentication protocol including receiving at least one message from the second node over said communications link, wherein said at least one message is discarded if it does not form part of the authentication protocol;

in response to determining that the authentication protocol was successful, setting the status of the second node as trusted;

receiving a second network management message at the first node from the second node;

in response to determining that the second node's status is set to trusted, not discarding the second network management message.

* * * * *